United States Patent [19]

Brown

[11] Patent Number: 5,206,982

[45] Date of Patent: May 4, 1993

[54] DIE TRANSFER STRUCTURE AND METHOD

[76] Inventor: Donald H. Brown, 19725 Somers, New Boston, Mich. 48164

[21] Appl. No.: 573,352

[22] Filed: Aug. 27, 1990

[51] Int. Cl.⁵ .............................................. B30B 15/00
[52] U.S. Cl. ...................................... 29/559; 100/224;
100/229.R; 100/918; 269/22; 269/99; 269/101;
269/289 MR; 414/676
[58] Field of Search ........... 414/676; 100/224, 229.12,
100/918; 193/35 SS, 35 MD; 269/22, 99, 101,
289 MR; 29/559

[56] References Cited

U.S. PATENT DOCUMENTS

| | | | |
|---|---|---|---|
| 3,011,665 | 12/1961 | Wise | 193/35 SS |
| 3,831,427 | 8/1974 | Lee | 100/918 X |
| 3,926,032 | 12/1975 | Brooks et al. | 100/918 X |
| 4,036,345 | 7/1977 | Webb | 193/35 SS |
| 4,052,919 | 10/1977 | McKissack | 100/918 X |
| 4,445,678 | 5/1984 | George | 269/99 X |
| 4,498,384 | 2/1985 | Murphy | 193/35 SS X |
| 4,627,526 | 12/1986 | Masciarelli | 193/35 MD X |
| 4,700,624 | 10/1987 | Murphy | 100/224 |
| 4,819,554 | 4/1989 | Fleischer et al. | 100/224 |
| 4,912,961 | 4/1990 | Brown | 72/462 |

Primary Examiner—Robert J. Spar
Assistant Examiner—Janice Krizek

[57] ABSTRACT

Structure for and method of die transfer. The structure comprises low friction bearing structures set into elongated T-slot bars secured in parallel, transverse spaced apart relation on a bolster plate and a die transfer truck table top actuable in response to the table top being raised to the level of the top of the T-slot bars with the table adjacent the bolster plate to raise a die positional on either the truck or bolster plate and facilitate universal movement of the die in a plane parallel to the top of the bolster plate. V-block and pin structure for centering the die on the bolster plate and die clamping structure including a washer having one straight edge and which moves axially of a bolt with a nut are also part of the die transfer structure. The method comprises providing T-slots on a bolster plate with the elongated T-slot bars centering the die on the bolster plate with the V-block and pin structure and selectively actuating a plurality of the low friction die pads simultaneously to permit universal, substantially friction free movement of a die in a plane parallel to the top of the bolster plate in response to arrival of the top of the table top at the top of the bolster plate.

20 Claims, 4 Drawing Sheets

1

DIE TRANSFER STRUCTURE AND METHOD

BACKGROUND OF THE INVENTION

1. Field of the Invention

The invention relates to die transfer structures and methods, and refers more specifically to a structure for and method of transferring a die from a die transfer truck to a bolster plate on a press or the like, providing a bolster plate in position on a press with T-slots without machining the bolster plate, centering a die on a bolster plate, and clamping a die to a bolster plate.

2. Description of the Prior Art

In the past, dies have often been placed on a press bolster plate and moved around on the bolster plate manually to align the dies in a desired position. Dies have then been clamped to the bolster plate in a fixed position for use. The dies have often been centered on the bolster plate in these fixed positions.

Prior bolster plates have sometimes been flat on top. However, many of them have T-slots machined in the top surface of the bolster plate to facilitate clamping of dies to the bolster plate. Wherein a bolster plate of the past has been flat on top and it has been desired to put T-slots in the bolster plate, it has usually been necessary to remove the bolster plate from the press on which it is installed, which often requires disassembly of the press. Alternatively, recently it has been possible to machine T-slots in a bolster plate with portable equipment placed on the bolster plate with the bolster plate in the press. Prior to the present invention, however, it has not been known to manufacture structures and secure them to a bolster plate to provide T-slots on the top of the bolster plate.

Further, movement of dies on bolster plates and on die transfer trucks or carts especially designed for movement of dies from storage racks and the like has seldom been facilitated by adequate means for reducing friction between the dies and the bolster plates or table tops of the trucks. Consequently, moving dies, especially the larger ones, onto and off of bolster plates and aligning or centering the dies on the bolster plates has, in the past, usually been a laborious and time consuming job.

Wherein means for reducing friction between a die and a bolster plate or truck table top to facilitate die transfer has been provided in the past, the structure and method provided has usually not facilitated universal movement of the die in the plane of the top of the truck table or bolster plate, and has not provided means for assuring the die transfer truck table is at the same level as the bolster plate during transfer of the die. Such prior systems have also often facilitated transfer of the die only in a straight line.

Accordingly, the die transfer systems of the past have been useful primarily in conjunction with transferring dies on or off of presses where space is unlimited and the desired direction of movement of the die onto the bolster plate is compatible with the direction permitted by the prior die transfer systems. Such systems are, for example, that provided by elongated rollers placed in the truck table and the bolster plate which facilitate movement of the die along a line onto or off of the bolster plate.

In addition, the die transfer systems of the past have generally been unable to accomodate dies with risers attached to the bottom thereof due to the spaces between the bearings of the die transfer systems and the spaces between the risers. Wherein risers have been attached to dies in the past, it usually has been necessary to provide a plate on the bottom of the risers to accomodate prior die transfer systems.

Also, alignment of dies on bolster plates and centering of the dies on the bolster plates has in the past generally been accomplished by manually pushing the dies around on the bolster plate and measuring the position of the dies with respect to a refererence point or lines on the bolster plate or press. The distances from the reference points or lines are different for each press a die is centered on. Such die positioning method is energy and time consuming, tires skilled workmen, and requires down time of the press on which the die is being positioned, which is not economical.

The linear die transfer systems alluded to above only partially eliminate the problems of die alignment in that they only facilitate movement of the die in one direction on a bolster plate or truck table. Further, such linear systems do not provide a centered or exactly aligned die on a bolster plate.

In the past, clamping of dies in position on a bolster plate has been accomplished in a plurality of ways, such as with clamps having a toe on the die and a heel on a block with a bolt in between the two secured in holes or T-slots in the bolster plate or the like. Such clamping is generally not done scientifically in that the holding power of the clamps is varied by the positions of the clamp heel, block and bolt. The clamping force is usually not exactly calculated.

Wherein clamping structures have been provided secured to the die or engaged with the die and secured to the bolster plate immediately adjacent the die, they have been of a nature as to require excessive time in undoing bolts, removing washers and the like during clamping and unclamping of the dies. Automatic clamps are available, however, they are complicated and expensive.

SUMMARY OF THE INVENTION

In accordance with the invention, there is provided a structure for and method of facilitating transferring a die onto or off of a bolster plate on the press or the like, and/or onto and off of a die transfer truck with the truck table top and top of the bolster plate at the same height. Further in accordance with the invention, universal movement of the die in the plane of the top of the bolster plate and/or the truck table top is facilitated.

Structure for and a method of providing T-slots on the bolster plate to facilitate the transfer is also included in the invention. In accordance with the invention, elongated members having a T-shaped cross section are secured to the bolster plate top in transverse spaced apart relation to provide the bolster plate with T-slots without removal of the bolster plate from the press in which it is installed or machining the bolster plate in place in the press.

Aligning and centering means are included in the invention to facilitate the rapid, accurate centering of a die on a bolster plate. The aligning and centering means includes V-blocks on the dies and pins for positioning in selected holes in the bolster plates. Aligning and centering of a die requires engagement of properly positioned pins with a pair of V blocks on a die. The die and bolster plates are coded to insure proper positioning of the pins on the bolster plates. Further, with the aligning and centering means of the invention, a die can be centered on any bolster plate and thus may be readily moved from press to press and centered with a minimum of effort.

In addition a special clamp, and in particular a unique nut and washer for a special clamp, has been provided in accordance with the invention to facilitate rapid clamping and releasing of a die on a bolster plate. In accordance with the structure and method of the invention, the nut includes a washer secured thereto for axial movement on a bolt therewith and for rotation relative thereto. The washer has one straight or clipped edge.

DESCRIPTION OF THE PREFERRED EMBODIMENT

Figure 1:
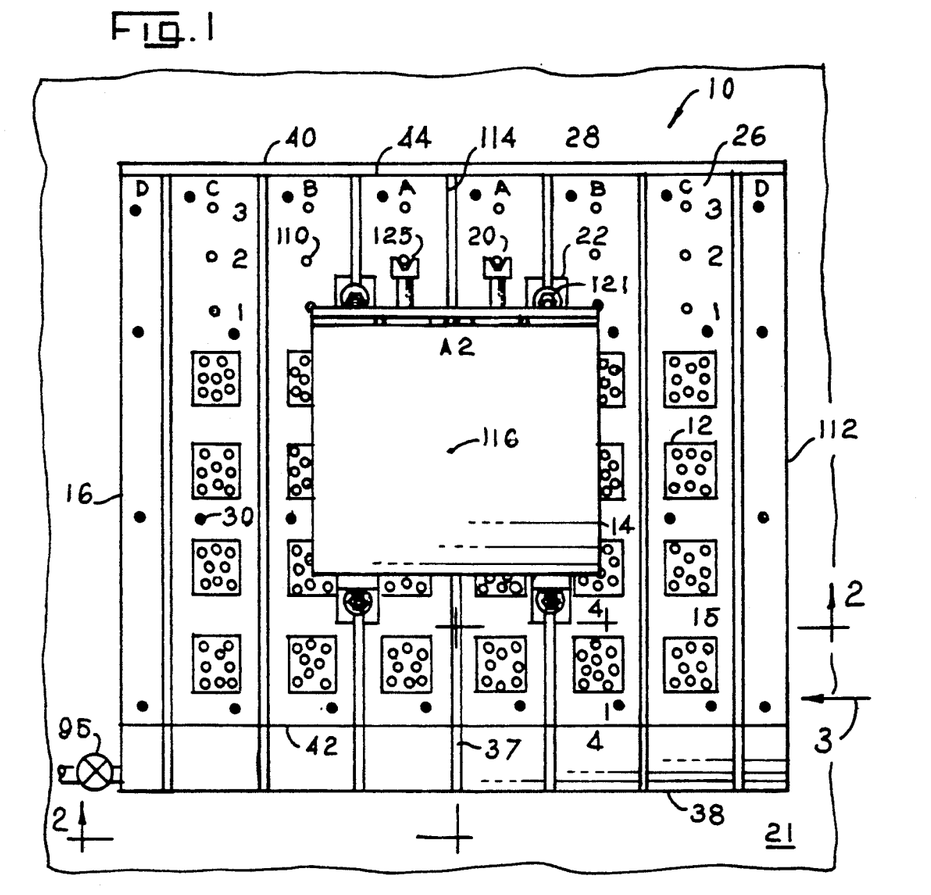
FIG. 1, is a plan view of a bolster plate positioned on a press, including T-slot, die transfer, centering and clamping structure associated therewith, constructed in accordance with the invention for practicing the method of the invention.

The die transfer structure 10 as shown in FIG. 1 comprises means 12 for facilitating universal, substantially friction free movement of a die 14 in a plane parallel to the top of a bolster plate 18 mounted on a press 21, and includes bearing structures 15. In addition, the structure of the invention includes T-slot bar means or structure 16 for providing T-slots on the top of a bolster plate 18. Centering means, i.e. V-block and pin structure, 20 for centering the die 14 on bolster plate 18 and clamping means 22 for securing the die 14 in a centered position on the bolster plate 18, including a unique nut 120 and washer 122 constructed in accordance with the invention, as shown in FIGS. 11 through 14, are also included as part of the structure of the invention.

In accordance with the method of the invention, if the bolster plate 18 is not provided with T-slots in the top surface thereof, T-slot bar means 16 is manufactured and secured to the top 17 of the bolster plate 18. Low friction bearing structures 15 are actuated to facilitate movement of a die 14 from a die transfer truck 25 or the like into a centered position on the bolster plate 18 as determined by the V-block and pin structure 20. The die is clamped in a centered position by the clamping means 22 including nut and washer structure 121 constructed in accordance with the invention. In movement of the die 14 over the top surface of the T-slot structure 16, the bearing structures 15 permit substantially friction free universal movement in the plane of the top of the T-slot bar structure.

Figures 3, 4:
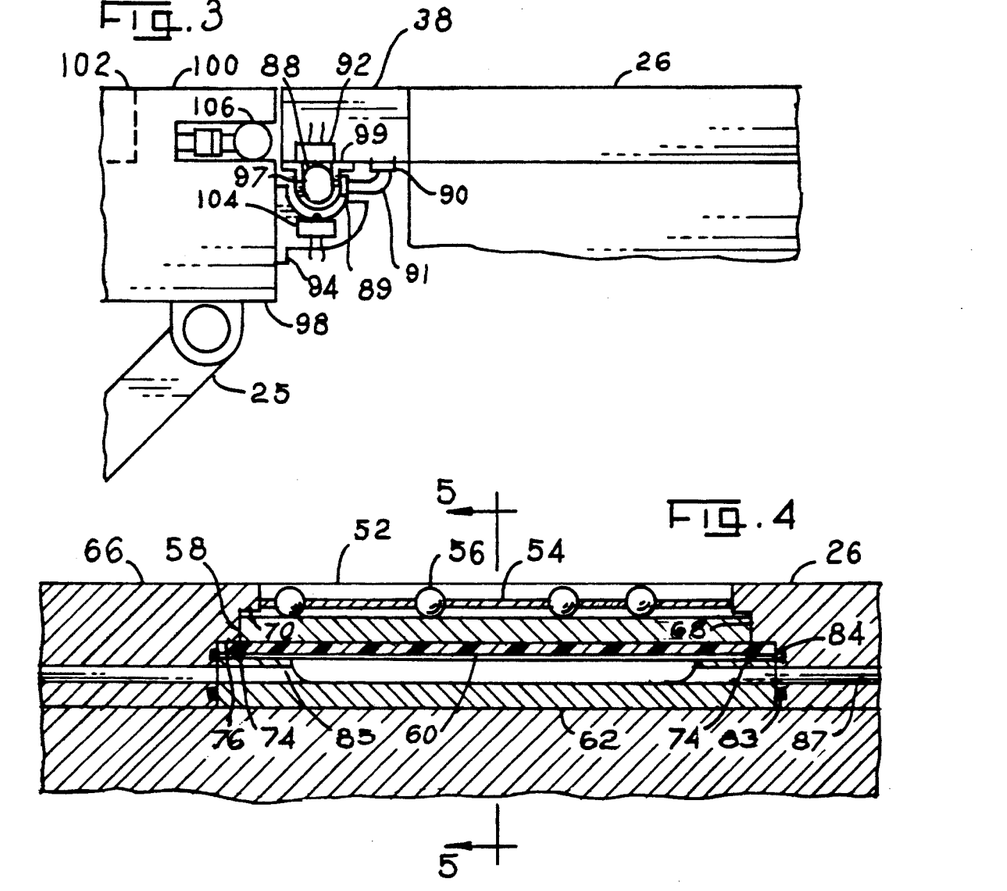
FIG. 3, is an enlarged section view of a portion of the structure illustrated in FIG. 1, taken substantially in the direction of arrow 3 in FIG. 1 and showing a die transfer truck associated with the bolster plate and press of FIG. 1.
FIG. 4, is an enlarged partial longitudinal section view of the low friction bearing structure of the invention in an elongated T-slot bar of the invention for practicing the method of the invention, taken substantially on the line 4—4 in FIG. 1.

The die transfer truck 25 shown in FIG. 3 also has low friction bearing structure 102 in the table 98 thereof. The low friction bearing structures in both the die transfer truck and bolster plate 18 are actuated in response to the top 100 of the die transfer table 98 reaching the level of the top 66 of the T slot bar structure 16 on the bolster plate 18 with the die transfer truck 25 immediately adjacent the bolster plate 18.

In accordance with the die transfer structure and method of the invention, dies of substantially any size may be readily positioned on the T-slot bar structure 16 of the bolster plate 18 from a truck 25, moved about the bolster plate 18 substantially universally in a plane parallel to the top of the bolster plate 18 to be centered and clamped in position with minimum physical exertion of a workman and without the workman having particular die set up skills. Further, die set up is accomplished in accordance with the method of the invention with a minimum of press down time. The structure of the invention is particularly easy to manufacture, simple in design, and economical in use.

Figure 2:
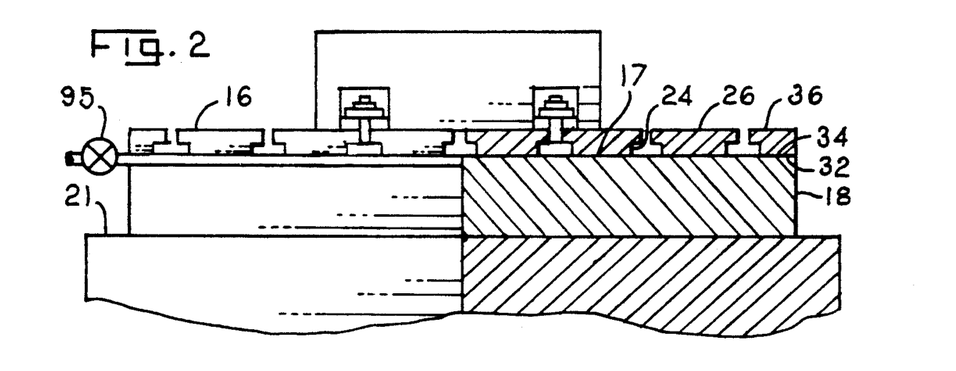
FIG. 2, is a partial elevation, partial section view of the structure illustrated in FIG. 1, taken substantially on the line 2—2 in FIG. 1.
Figure 5:
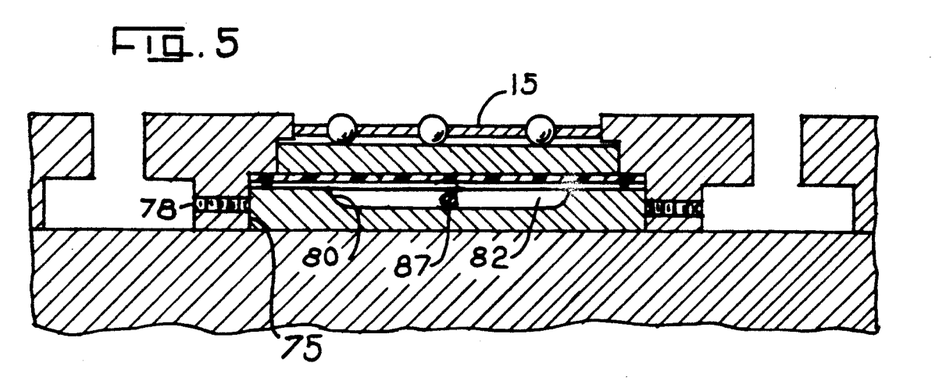
FIG. 5, is a section view of the structure shown in FIG. 4, taken substantially on the line 5—5 in FIG. 4.

More specifically, as shown best in FIGS. 1 through 5, wherein a bolster plate 18 on a press 21 is not provided with T-slots in the top thereof, T-slots 24 may be provided by producing a plurality of elongated T slot bars 26 having a T-shaped cross section as shown in FIGS. 2 and 5. The T-slot bar members 26 are cut into desired lengths and are secured to the top of the bolster plate 18 in parallel spaced apart positions, again as shown best in FIGS. 1 and 2. The spacing between the T-slot bars 26 provides the stem or neck 28 of the T-slots.

The T-slot bars 26 are secured to the top of the bolster 18 by countersunk bolts 30 positioned between bearing structures 15 or may be adhered in place by an adhesive 32 placed on the bottom 34 of the stem of the T-slot bars 26. Both the bolts 30 and the adhesive 32 may be utilized simultaneously to secure the T-slot bars in position on the bolster plate 18.

It will be understood that the T-slot bars 36 at the edge of the bolster 18 may be flat on one side to coincide with the edge of the bolster 18 or to make a more finished appearance for the edges of the T-slot structure 16 on the bolster plate 18 as desired.

Further, in installation of the T slot bars 26 and 36, it will be understood that the T-slot bars are manufactured and are positioned in a jig or the like after being cut to the desired length and provided with the desired elevation configuration after which a front bar 38 having mating T-slots therein is welded or otherwise secured to the front ends 42 of the T-slot bars 26 and 36. Similarly, a back bar 40 is removably attached to the back end 44 of the T-slot bars 26 and 36 by convenient means such as bolts and the like. The bars 38 and 40 serve to keep the T-slot bars 26 and 36 in alignment while they are being transferred to, positioned on and secured to the bolster plate 18. After the T-slot bars 26 and 36 are secured to the top of the bolster plate 18, the back bar 40 may be removed therefrom and reused if desired. The front bar 38, however, is permanently fixed to the front end 42 of the T-slot bars 26 and 36.

To facilitate the movement of the die 14 on the bolster plate 18, the substantially friction free bearing structures 15, as shown best in FIGS. 1, 4 and 5, are constructed with the T slot bars 26. Thus, as shown in FIG. 1, each T-slot bar 26 is provided with longitudinally spaced apart bearing structures 15 for over half the length of the T-slot bars 26. The bearing structures 15 may be selectively actuated simultaneously, as will be seen subsequently.

Each bearing structure 15, as shown best in FIGS. 4 and 5, includes a bearing pad 52 including a substantially flat bearing race 54 in which a plurality of ball bearings 56 are held in random locations, a bearing support plate 58, a flexible and/or resilient diaphragm 60 and a bottom plate 62. The bearing pad 52, bearing support plate 58, diaphragm 60 and bottom plate 62 are all generally rectangular and fit within opening 64 through T-slot bar 26. The openings 64 in the T-slot bar 26 is stepped on all four sides, as shown in FIGS. 4 and 5.

Thus, the bearing pad 52 rests on top of the bearing support plate 58 for movement between positions very slightly above and very slightly below the top 66 of the T-slot bar 26 in accordance with the position of the bearing support plate 58 in the step 68 of the recess 64. Bearing support plate 58 moves up and down in the step 68 in accordance with the condition and/or position of the diaphragm 60 on which it rests. The abutment 70 prevents the bearing support plate 58 from movement out of the opening 64 and thus prevents moving of the bearing pad 52 out of the opening 64 by the bearing support plate 58.

Diaphragm 60 is sealed around its periphery around the periphery of the bottom plate 62, since the edges of the diaphragm 60 having ridges 74 thereon are clamped between the abutment 76 in the stepped opening 64 and the bottom plate 62 which may be secured to the T-slot bar 26 against the abutment 75 in the opening 64 by convenient means such as set screws 78 or the like in its final desired position with its bottom surface 79 even with surface 32 of the T-bar structure.

As shown in FIGS. 4 and 5, the bottom plate 62 is provided with a recess 80 therein over a large portion of its length between the ends of the diaphragm 60, providing a chamber 82 between the bottom plate 62 and the diaphragm 60. Further, as shown in FIG. 4, the chambers 82 in different bearings structures 15 in the same T slot bar 26 are connected by longitudinal passages 85 in the bottom plate 62, and 87 in the T-slot bars 26, as shown. A seal is provided between the passages in the bottom plate 62 and the T slot bars 26 by means such as annular grooves 83 in bars 26 and O-rings 84 or the like.

In operation, actuating fluid may be coupled to the bearings structures 15 through passages 85 and 87 and chambers 80 to raise or lower the bearing pads 52 on expansion of the diaphragm 60, and consequently raising or lowering the bearing pads 52 to permit substantially friction free movement of the die thereover. The actuating fluid may be either a gas such as air or a liquid such as hydraulic fluid.

As shown best in FIGS. 1, 2 and 3, actuating fluid may be passed into or exhausted from the T slot bars 26 through the conduit 88 secured beneath the front bar 38 at the front end of the T-slot bars 26. The individual T-slot bars 26 are connected through couplings 89 and 90 on the conduit 88 and front bar 38 between which flexible conduit 91 extends. The actuating fluid is passed into the conduit 88 through a valve 95 at one end thereof, which valve is actuated by a pressure switch 92 set in the front bar 38.

Actuation of the pressure switch 92 is caused on engagement thereof of conduit 88 caused by a switching bar 94 provided on the die transfer truck 25. The conduit 88 has flat ridges 97 at spaced apart locations thereon and thus is permitted to slide vertically in mounting brackets 99 therefore. The switching bar 94 is secured to the table 98 of the die transfer truck 25 and is located with relation to the top 66 of the T-slot bars 26 on the bolster plate 18 so the switch 92 is actuated to provide actuating fluid into the T-slot bars 26 when the table 98 has been raised to a point where the top 100 of the table is exactly even with the top 66 of the T-slot bars 26. Such alignment permits ready transfer of the die 14 from the truck 25 onto the bolster plate 18.

To further facilitate die transfer between the truck 25 and the bolster plate 18, the top 100 of the table 98 may also be provided with bearing structures 102 therein such as bearing structures 15 and the bearing structures 102 may be actuated by a pressure switch 104 set in the switching bar 94 to provide actuating fluid through the conduit 106 in the top 100 of the table 98 on contact of the switching bar 94 with the conduit 88. Switches 92 and 104 may be biased to cause actuation of one of the switches first, as desired. Thus, in a preferred embodiment, it would be desirable to have the upper switch 92 actuate first and the lower switch to actuate second and to also shut off the raising of the table 98, all in rapid succession on raising of the table top to cause the switching bar 94 to contact conduit 88.

Die transfer trucks or carts, both manual and powered, are well known and will not therefore be described in detail herein. Existing die transfer truck tables 98 may be modified as shown in FIG. 3 to include the selectively actuable bearing structures 102, switch bar 94, switch 104, conduit 106 and associated structure therein to facilitate movement of dies on the truck tables.

The structure 20 for centering the die 14 on the bolster plate 18 comprises a plurality of holes 110 spaced apart longitudinally in each of the T slot bars 26 in rows which start after the last bearing structure 15 and are numbered from the center line 112 toward the back end 44 of the T slot bars 26 in rows 1-3, etc., for example, in the embodiment of the invention shown in FIG. 1 on 3" increments. It will be understood that more rows of holes 110 may be provided, depending on the size of the bolster plate and that the first row on each bolster plate will be the same distance from the center line of the bolster plate.

In addition, a T-slot stem 114 is centered on the center 116 of the bolster plate 18 and the T-slot bars 26 are numbered in pairs on each side of the center 116, A, B, C, etc.

Pairs of pins 125 are selectively positioned in any of the openings 110. As shown in FIG. 1, two pins 125 are positioned in holes A2.

Figure 6:
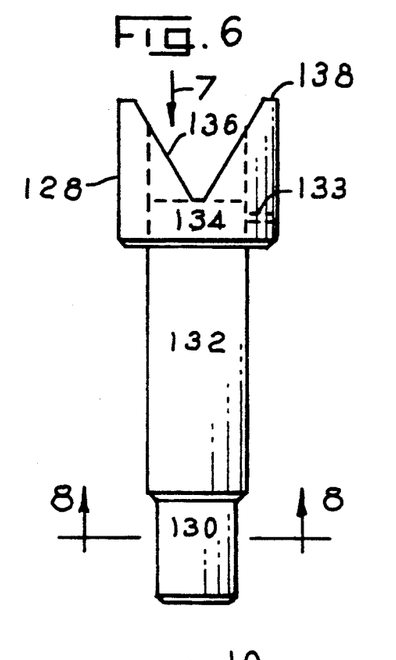
FIG. 6, is an enlarged plan view of the V-block structure constructed in accordance with the invention shown in FIG. 1 for practicing the method of the invention.
Figure 10:
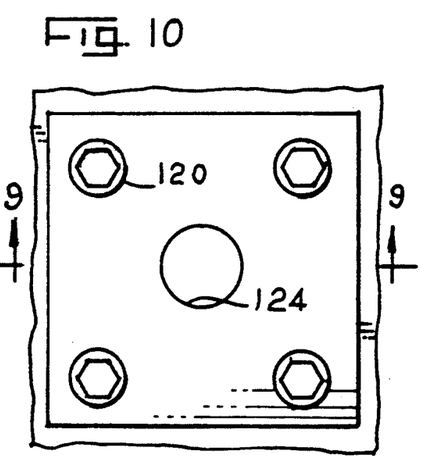
FIG. 10, is an elevation view of the centering pad illustrated in FIG. 9, taken in the direction of arrow 10 in FIG. 9.

Two centering pads 118 are secured to the die 14 by bolts 120. Holes 124 are provided in the centering pads 118, as shown best in FIG. 10. The holes 124 are of a diameter to receive the shank 126 of V-blocks 128, best shown in FIGS. 6, 7 and 8. The pads 118 are positioned on each side of the center 116 of die 14 in exact alignment with a selected pair of bolster plate holes.

Figure 7:
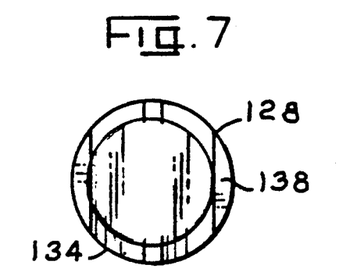
FIG. 7, is an end view of the V-block structure shown in FIG. 6, taken substantially in the direction of arrow 7 in FIG. 6.
Figure 8:
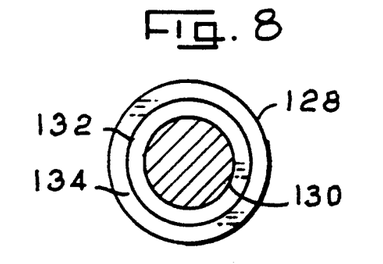
FIG. 8, is a section view of the V-block structure shown in FIG. 6, taken substantially on the line 8—8 in FIG. 6.
Figure 9:
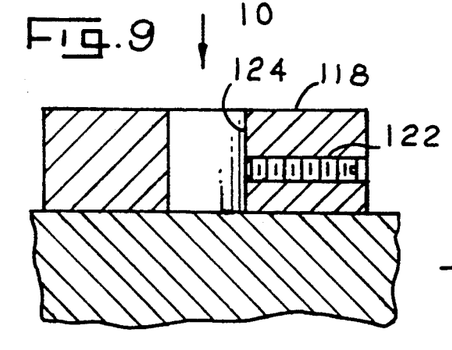
FIG. 9, is a plan view of a centering pad illustrated in FIG. 1, taken substantially in the direction of arrow 9 in FIG. 10.

Each V-block is cylindrical, as shown best in FIGS. 7 and 8, and includes three separate diameter portions 130, 132 and 134. Portion 130, as indicated previously, is adapted to fit snugly within an opening 124 to mount the V-block 128 on the centering pad 118 on placing of a V-block 128 in the opening 124 and centering of the die on a bolster plate master fixture the V-block is secured. The portion 132 of the V-block 128 spaces the V block portion 134 from the die 14. The portion 134 of the V-block structure is exactly positioned on the portion 132 and is held by set screw 133 while it is secured to portion 132 by means such as welding prior to securing portion 132 to the centering pad 118. The V-shaped recess 136 is provided in surface 138 of the V-block portion 134 to receive a pin 125 in use.

In accordance with the method of the invention, for centering the die 14, the centering pads 118 are positioned on the die 14 such that, with the V-blocks secured thereto, pins 125 positioned in selected holes in the T-slot bars 26 will exactly fit within the V-notch 136 when the die 14 is exactly centered on the bolster plate 18.

The length of the portions 132 on V-blocks 128 is determined by the size of the die 14, and once a V-block has been exactly positioned on a die 14, the die 14 may be positioned on any bolster plate having similar rows of openings 1, 2, 3, etc. spaced on 3" centers in columns on T-slot bars 26.

Centering of the die 14 on any bolster plate then requires coding of the die to indicate row, that is rows 1, 2, 3, etc., and columns, that is columns AA, BB, CC, etc., and coding the die with numbers stamped into it, such as 2A for the die 14 in FIG. 1, so that the die set up personnel need only place the pins 125 in row 2 in the A, T-slot bars and move the die on the bolster plate until the V-notches 136 engage pins 125 to exactly center the die 14 on any bolster plate 18, constructed as shown in FIG. 1.

Further, any larger or smaller dies may be similarly centered on the bolster plate 18 or similarly coded bolster plate by the same procedure, providing only that the position of the holes in the T-slot bars is accurate on each bolster plate and the pins are positioned in the proper holes designated on the dies with V-blocks attached thereto.

Following centering of the die 14 on the bolster plate 18, the low friction die structures 15 are deactivated so that the die is positioned on the bolster plate in exactly centered position. The die is then clamped in place with clamping structure 22.

Clamping structure 22 is disclosed in detail in U.S. Pat. No. 4,912,961 and will not therefore be considered in detail herein. The description of the clamping structure 22 disclosed in U.S. Pat. No. 4,912,961 is included herein by reference.

In addition, in accordance with the invention, the nut 120 and washer 122 of the clamping structure 22 as shown best in FIGS. 11 through 16 are unique in that the nut 120 and washer 122 are secured together to provide movement of the washer 122 axially of the bolt 124 with the nut 120 on relative rotation between the nut 120 and bolt 124 without rotation between the nut and washer 122.

Figure 11:
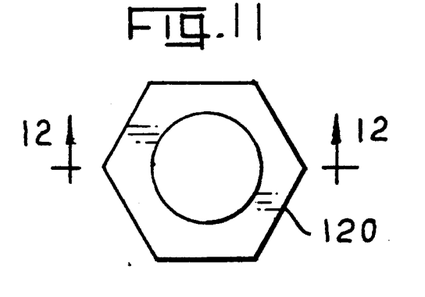
FIG. 11, is a plan view of a nut constructed in accordance with the invention for practicing the method of the invention.
Figure 12:
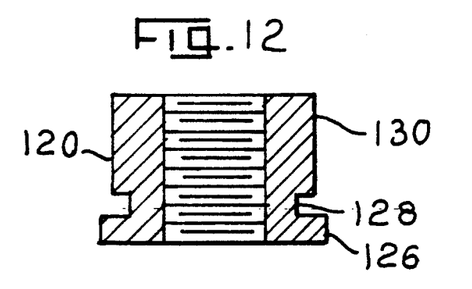
FIG. 12, is a longitudinal section view of the nut shown in FIG. 11, taken substantially on the line 12—12 in FIG. 11.

Accordingly, the nut 120, as shown best in FIGS. 11 and 12, includes a cylindrical portion 126 having an annular groove 128 therearound below the hexagonal head portion 130 of the nut.

Figure 13:
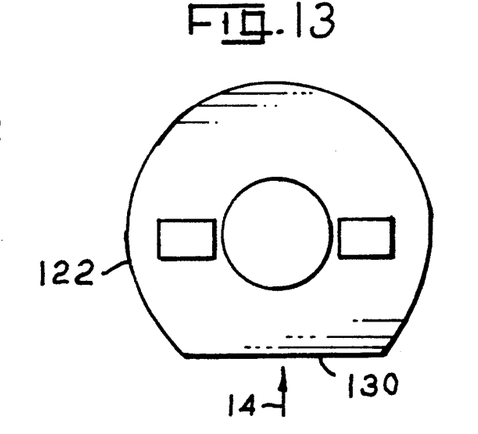
FIG. 13, is a plan view of a washer constructed in accordance with the invention for practicing the method of the invention.
Figure 14:
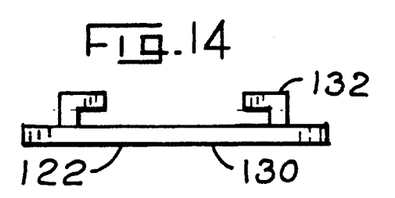
FIG. 14, is an elevation view of the washer of FIG. 13, taken substantially in the direction of arrow 14 in FIG. 13.

The washer 122, which is substantially circular in plan view as shown in FIG. 13, has one straight edge 130 defining a chord of the circular washer 122. In addition, L-shaped tabs or finger like portions 132 are provided on the washer 122 as shown in FIG. 14, spaced approximately 180° apart angularly and extending first perpendicularly to the surface of the washer 122 from one side thereof, and then parallel thereto radially inwardly of the washer 122. As shown in FIG. 13, tabs 132 may be formed with the washer during stamping by providing the strap portion 133, cutting it centrally, cutting the washer radially at the ends of the strap portion, and deforming the strap portion to provide the tabs as shown in FIG. 14.

Figures 15, 16:
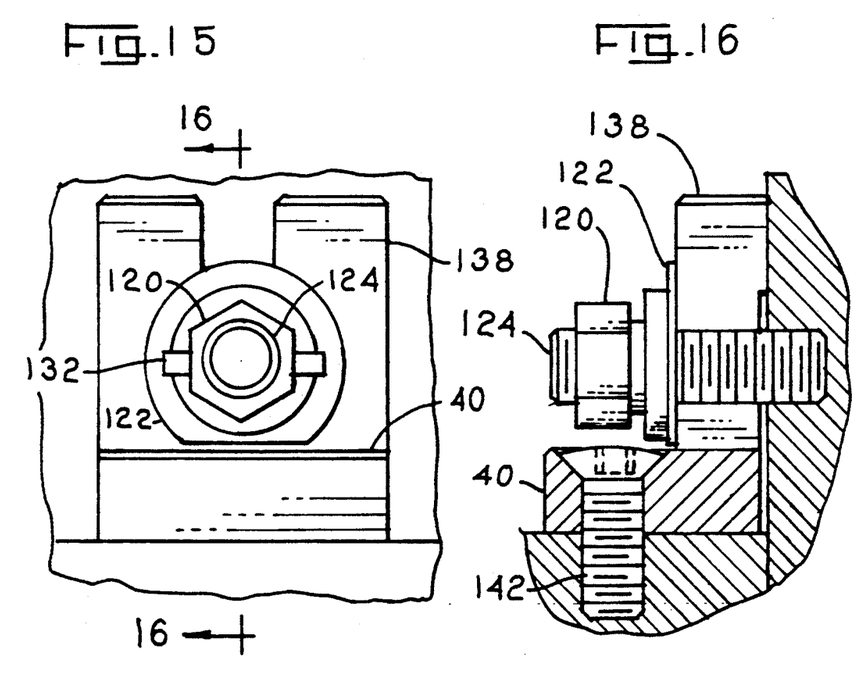
FIG. 15, is a plan view of nut and washer structure as shown in FIGS. 11 through 14 in assembly with clamping structure as shown in FIG. 1 for practicing the method of the invention.
FIG. 16, is a section view of the structure illustrated in FIG. 15, taken substantially on the line 16—16 in FIG. 15.

In assembly of the nut 120 and washer 122, the parallel extending portions of the tabs 132 extend into the recess 128 on the nut. Thus, the washer is secured to the nut for axial movement therewith on the bolt 124 on threading of the nut onto or off of the bolt 124. However, the washer 122 is permitted to rotate relative to the nut 120 whereby, with the washer and nut threaded over the bolt 124 as shown in FIG. 16 and with the washer positioned relative to the clamp 138 so that the straight edge 130 thereof abuts the portion 140 of the clamp 138, the washer is prevented from rotation but it is required to move axially of the bolt 124 with the nut on rotation of the nut.

With such bolt and nut structure, clamping of the die 14 having the clamp 138 secured thereto, to the bolster plate 18 by means of the bolt 142 and release of the die from the bolster plate is facilitated, since with the nut backed off on the bolt 124 only slightly, the nut and washer are clear of the clamp so that the bolt 124 may be slid away from the clamp 138 in a T-slot and the die 14 removed from the bolster plate.

While one embodiment of the invention has been considered in detail, it will be understood that other embodiments and modifications are contemplated by the inventor.

Thus, for example, the low friction bearing structures 15 and attendant structures may be provided in a bolster plate already having T-slots therein or being manufactured with T-slots in the surface thereof.

It is the intention to include all embodiments and modifications of the invention as are defined by the appended claims within the scope of the invention.

I claim:

1. Die transfer structure for transferring a die into and off of a press bolster plate, comprising multiple T-slot bar means, separate from and secured to the bolster plate, defining T-slots in conjunction with the bolster plate, low friction bearing means including a plurality of separate bearing structures which facilitate two dimensional universal movement of the die positioned between the defined T-slots in spaced apart relation in the T-slot bar means on the bolster plate and means for actuating the bearing structures to facilitate two dimensional universal movement of the die on top of the bolster plate, centering means operable between the die and T-slot bar means for exactly centering the die on the bolster plate, and clamp means operable between the die and T-slot bar means for securing the die in a position on the bolster plate.

2. Structure as set forth in claim 1, wherein the bearing structures comprise a bearing pad, a bearing support plate beneath the bearing pad, a diaphragm beneath the support plate, and a bottom plate securing the diaphragm in position beneath the support plate and providing a fluid chamber beneath the support plate and diaphragm, and the actuating means includes structure for selectively passing actuating fluid into or out of the chamber between the diaphragm and bottom plate.

3. Structure as set forth in claim 2, wherein the means defining T-slots in conjunction with the bolster plate comprises a plurality of elongated T-slot bars having a T-shaped cross section and means for securing the T-slot bars to the top of the bolster plate in parallel positions spaced apart a distance equal to the dimension of the stem of the T-slots.

4. Structure as set forth in claim 1, wherein the means for centering the die on the bolster plate comprises at least two V-blocks having a V-shaped recess therein secured to the back of the die and at least two pins extending perpendicularly from the surface of the bolster plate with the V blocks and pins being constructed and positioned on the bolster plate and die whereby, with the pins in engagement with the V-blocks in the V-shaped recess, the die is centered on the bolster plate.

5. Structure as set forth in claim 1, wherein the means for clamping the die to the bolster plate comprises at least one L-shaped clamp, means securing one leg of the clamp to the die with the other leg of the clamp extending over a T-slot in the bolster plate, a T bolt extending through the other leg of the clamp with the head of the T bolt in the T-slot and a washer and nut positioned over the end of the T-bolt extending through the other leg of the clamp, and means operable between the washer and nut for moving the washer axially of the bolt with the nut.

6. The method of transferring a die between a die transfer truck having a table top and a press bolster plate, comprising providing the truck table top and bolster plate with T-slots in the top thereof, providing bearing structures between the T-slots which facilitate universal movement of the die in two dimensions in the truck table top and the bolster plate, placing the truck next to the bolster plate, aligning the top of the truck table and the top of the bolster plate, activating the bearing structures in the truck and bolster plate to raise the bearing structures above the top of the truck table and bolster plate and facilitate two dimensional universal movement of the die from the truck to the bolster plate and centering of the die on the bolster plate, centering the die on the bolster plate, deactivating the bearing structures and clamping the die in its centered position on the bolster plate.

7. The method as set forth in claim 6, wherein the T-slots are provided in the bolster plate by securing elongated members having a T-shaped cross section in parallel rows on the bolster plate spaced apart by a dimension equal to a desired dimension of the stem of the T-slots.

8. The method as set forth in claim 6, wherein actuation of the bearing structures comprises providing operating fluid between a bottom plate and a diaphragm to deform the diaphragm and move a support plate into engagement with a bearing pad to move the bearing pad above the surface of the bolster plate.

9. The method as set forth in claim 6, wherein centering the die on the bolster plate comprises placing at least two pins in the bolster plate perpendicularly thereto, placing at least two V blocks on the die, and moving the V-blocks into engagement with the pins.

10. The method as set forth in claim 6, wherein clamping the die to the bolster plate includes securing a clamp to the die, placing a T-bolt head in a T-slot with the stem extending through the clamp, and placing a nut having a washer which moves axially of the T-bolt stem with the nut on the stem of the T-bolt and tightening the nut.

11. Die transfer structure for transferring a die onto and off of a press bolster plate, comprising multiple T-slot bar means, separate from and secured to the bolster plate, defining T-slots in conjunction with the bolster plate including a plurality of elongated T-slot bars having a T shaped cross section and means for securing the T-slot bars to the top of the bolster plate in parallel positions spaced apart a distance equal to the dimension of the defined T-slots, low friction bearing means including a plurality of separate bearing structures which facilitate two dimensional universal movement of the die positioned between the defined T-slots in spaced apart relation on the bolster plate, each bearing structure comprising a bearing pad, a bearing support plate beneath the bearing pad, a diaphragm beneath the support plate, and a bottom plate securing the diaphragm in position beneath the support plate and providing a fluid chamber beneath the support plate and diaphragm, and means for actuating the bearing structure including structure for selectively passing actuating fluid into or out of the chamber between the diaphragm and bottom plate to facilitate two dimensional universal movement of the die on top of the bolster plate, centering means operable between the die and bolster plate for exactly centering the die on the bolster plate, and clamp means operable between the die and bolster plate securing the die in a position on the bolster plate.

12. Structure as set forth in claim 11, wherein the means for centering the die on the bolster plate comprises at least two V-blocks having a V-shaped recess therein secured to the back of the die and at least two pins extending perpendicularly from the surface of the bolster plate with the V-blocks and pins being constructed and positioned on the bolster plate and die whereby, with the pins in engagement with the V-blocks in the V-shaped recess, the die is centered on the bolster plate.

13. Structure as set forth in claim 12, wherein the means for clamping the die to the bolster plate comprises at least one L-shaped clamp, means securing one leg of the clamp to the die with the other leg of the clamp extending over a T-slot in the bolster plate, a T-bolt extending through the other leg of the clamp with the head of the T-bolt in the T-slot and a washer and nut positioned over the end of the T-bolt extending through the other leg of the clamp, and means operable between the washer and nut for moving the washer axially of the bolt with the nut.

14. The method of transferring a die between a die transfer truck having a table top and a press bolster plate, comprising providing the bolster plate with T-slots by securing elongated members having a T-shaped cross section in parallel rows on the bolster plate spaced apart by a dimensional equal to a desired dimension of the stem of the T-slots, providing bearing structures which facilitate two dimensional universal movement of the die in the truck table top and the elongated members, placing the truck next to the bolster plate, aligning the top of the truck table and the top of the elongated members, activating the bearing structures to raise the bearing structures above the top of the truck table and elongated members to facilitate two dimensional universal movement of the die from the truck to the bolster plate by providing operating fluid between a bottom plate and a diaphragm in the bearing structures to deform the diaphragms and move supporting plates in the bearings structures into engagement with bearing pads in the bearing structure to move the bearing pads above the surface of the elongated members, centering the die on the bolster plate, deactivating the bearing structures and clamping the die in a centered position on the bolster plate.

15. The method as set forth in claim 14, wherein centering the die on the bolster plate comprising placing at least two pins in the T-slot bars perpendicularly thereto, placing at least two V-blocks on the die and moving the V-blocks into engagement with the pins.

16. The method as set forth in claim 15, wherein clamping the die to the bolster plate including securing a clamp to the die, placing a T-bolt head in a defined T-slot with a pin extending through the clamp, placing a nut which has a washer which moves axially of the T-bolt stem with the nut on the stem of the T-bolt and tightening the nut.

17. Die transfer structure for transferring a die onto and off of a press bolster plate comprising multiple T-slot bar means, separate from and secured to the bolster plate, defining T-slots in conjunction with the bolster plate, low friction bearing means including a plurality of separate bearing structures which when activated facilitate two dimensional universal movement of the die on the top of the bolster plate positioned between the defined T-slots in spaced apart relation in the T-slot bar means and means for actuating the bearing structures.

18. Structure as set forth in claim 17, and further including centering means operable between the die and bolster plate for exactly centering the die on the bolster plate.

19. Structure as set forth in claim 17, and further including clamp means operable between the die and bolster plate for securing the die in position on the bolster plate.

20. The method of transferring a die between a die transfer truck having a table top and a press bolster plate, comprising providing the truck table top and the bolster plate with T-slots in the top thereof, providing bearing structures in the truck table top and the bolster table top between the T-slots operable on actuation to facilitate two dimensional universal movement of the die from the truck to the bolster plate, placing the truck next to the bolster plate, aligning the top of the truck table and the top of the bolster plate, actuating the bearing structures in the truck and bolster plate to raise the baring structures above the top of the truck table and bolster plate, moving a die from the truck table to the top of the bolster plate, centering the die on the bolster plate, deactuating the bearing structures and clamping the die in position on the bolster plate.

* * * * *